(12) United States Patent
Rodriguez Valadez et al.

(10) Patent No.: US 9,928,151 B1
(45) Date of Patent: Mar. 27, 2018

(54) REMOTE DEVICE INTERFACE FOR TESTING COMPUTING DEVICES

(71) Applicant: Amazon Technologies, Inc., Seattle, WA (US)

(72) Inventors: Pedro De Jesus Rodriguez Valadez, Seattle, WA (US); Wayne Bryan, Bellevue, WA (US); Joel Kingery, Seattle, WA (US); Ricardo Jose Lopez, Seattle, WA (US); Graham Thomas Ludwinski, Motreal (CA); Hongda Zhao, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 169 days.

(21) Appl. No.: 14/568,540

(22) Filed: Dec. 12, 2014

(51) Int. Cl.
  *G06F 11/00* (2006.01)
  *G06F 11/26* (2006.01)
(52) U.S. Cl.
  CPC ..................... *G06F 11/26* (2013.01)
(58) Field of Classification Search
  CPC ............... G06F 11/3612; G06F 11/362; G06F 11/3636; G06F 11/3664
  See application file for complete search history.

(56) References Cited

U.S. PATENT DOCUMENTS

| | | | | |
|---|---|---|---|---|
| 7,206,548 B1* | 4/2007 | Sumler | .................. | H04B 17/23 455/420 |
| 7,283,816 B2* | 10/2007 | Fok | ......................... | H04L 12/26 455/418 |
| 7,925,740 B2* | 4/2011 | Nath | ..................... | H04W 24/08 455/404.2 |
| 8,320,904 B1* | 11/2012 | Celentano | ............. | H04W 24/04 455/423 |
| 8,650,277 B2* | 2/2014 | Gentile | ................. | H04L 43/065 709/217 |
| 8,996,674 B2* | 3/2015 | Ahmad | ............... | H04L 41/0213 709/204 |

(Continued)

OTHER PUBLICATIONS

Hess, Ken. 10 BYOD Mobile Device Management Suites You Need to Know [online]. ZDNet.com, Jun. 11, 2012 [retrieved on Nov. 19, 2014]. Retrieved from the Internet: <URL: http://www.zdnet.com/blog/consumerization/10-byod-mobile-device-management-suites-you-need-to-know/422>.

(Continued)

*Primary Examiner* — Elmira Mehrmanesh
(74) *Attorney, Agent, or Firm* — Kilpatrick Townsend & Stockton LLP

(57) ABSTRACT

Techniques for remote interfacing with one or more computing devices may be provided. For example, a computing node may be communicatively coupled with the one or more computing devices. Each of the one or more computing devices may be associated with a device-specific interface for interacting with the corresponding computing device. The computing node may host the one or more device-specific interfaces. The computing node may also host an agent. The agent may be configured to at least provide a common interface to interact with the one or more device-specific interfaces. As such, status information of the one or more computing devices may be monitored based at least in part on utilizing the common interface. The status information may also be provided for presentation.

20 Claims, 9 Drawing Sheets

(56) References Cited

U.S. PATENT DOCUMENTS

| | | | |
|---|---|---|---|
| 9,154,611 B1* | 10/2015 | Jackson | H04L 41/0253 |
| 9,189,378 B1* | 11/2015 | Ryan | G06F 11/3664 |
| 9,363,134 B1* | 6/2016 | Goodspeed | H04L 29/06 |
| 9,459,994 B2* | 10/2016 | Koneru | G06F 11/3688 |
| 2004/0058651 A1* | 3/2004 | Ross | H04W 24/00 455/67.11 |
| 2006/0116146 A1* | 6/2006 | Herrod | H04L 12/24 455/515 |
| 2006/0217116 A1* | 9/2006 | Cassett | H04L 41/5009 455/423 |
| 2009/0171474 A1* | 7/2009 | Birze | G05B 19/042 700/3 |
| 2009/0204964 A1* | 8/2009 | Foley | G06F 21/53 718/1 |
| 2009/0228873 A1* | 9/2009 | Drukman | G06F 11/3636 717/128 |
| 2011/0320879 A1* | 12/2011 | Singh | H04W 24/06 714/38.1 |
| 2013/0212512 A1* | 8/2013 | Frenz | H04L 67/06 715/771 |
| 2013/0262626 A1* | 10/2013 | Bozek | H04L 67/10 709/217 |
| 2014/0297859 A1* | 10/2014 | Qureshi | H04L 12/2856 709/225 |
| 2014/0351412 A1* | 11/2014 | Elisha | G06F 11/3452 709/224 |
| 2015/0067031 A1* | 3/2015 | Acharya | H04W 4/003 709/203 |
| 2016/0044520 A1* | 2/2016 | Iyer | H04W 24/08 370/252 |
| 2016/0132422 A1* | 5/2016 | Allen | G06F 11/3684 714/38.1 |
| 2016/0150425 A1* | 5/2016 | Kuru | H04W 24/06 370/252 |

OTHER PUBLICATIONS

XenMobile: Compare XenMobile to the Competition. Datasheet [online]. Citrix Systems, Inc., Nov. 19, 2014 [retrieved on Nov. 19, 2014]. Retrieved from the Internet: <URL: http://www.citrix.com/products/xenmobile/how-it-helps/compare.html>.

* cited by examiner

REMOTE DEVICE INTERFACE FOR TESTING COMPUTING DEVICES

BACKGROUND

Computing devices are used to access various types of services. Many of these services may be facilitated by different applications hosted on the computing devices. For example, a user may operate a browser of a smart phone to access a web page. In another example, a user may operate a shopping application of a tablet to access an electronic marketplace over a network and browse and purchase offered items. The browser and the shopping application are only two examples of a large number of available applications. Likewise, a smartphone and a tablet are only two examples of a large number of computing devices.

As the number of applications and types of computing devices increase, the available services to users may also increase. In certain situations, availability of a service may depend on an application or a computing device. For example, if the application is updated or if a new application becomes available, the service may be available if the updated or new application properly operates on the computing device. Similarly, if the computing device is updated (e.g., a new version of an operating system is loaded) or if a new computing device becomes available, the service may be also available if the update or new computing device properly executes the application.

BRIEF DESCRIPTION OF THE DRAWINGS

Various embodiments in accordance with the present disclosure will be described with reference to the drawings, in which.

DETAILED DESCRIPTION

Figure 1:
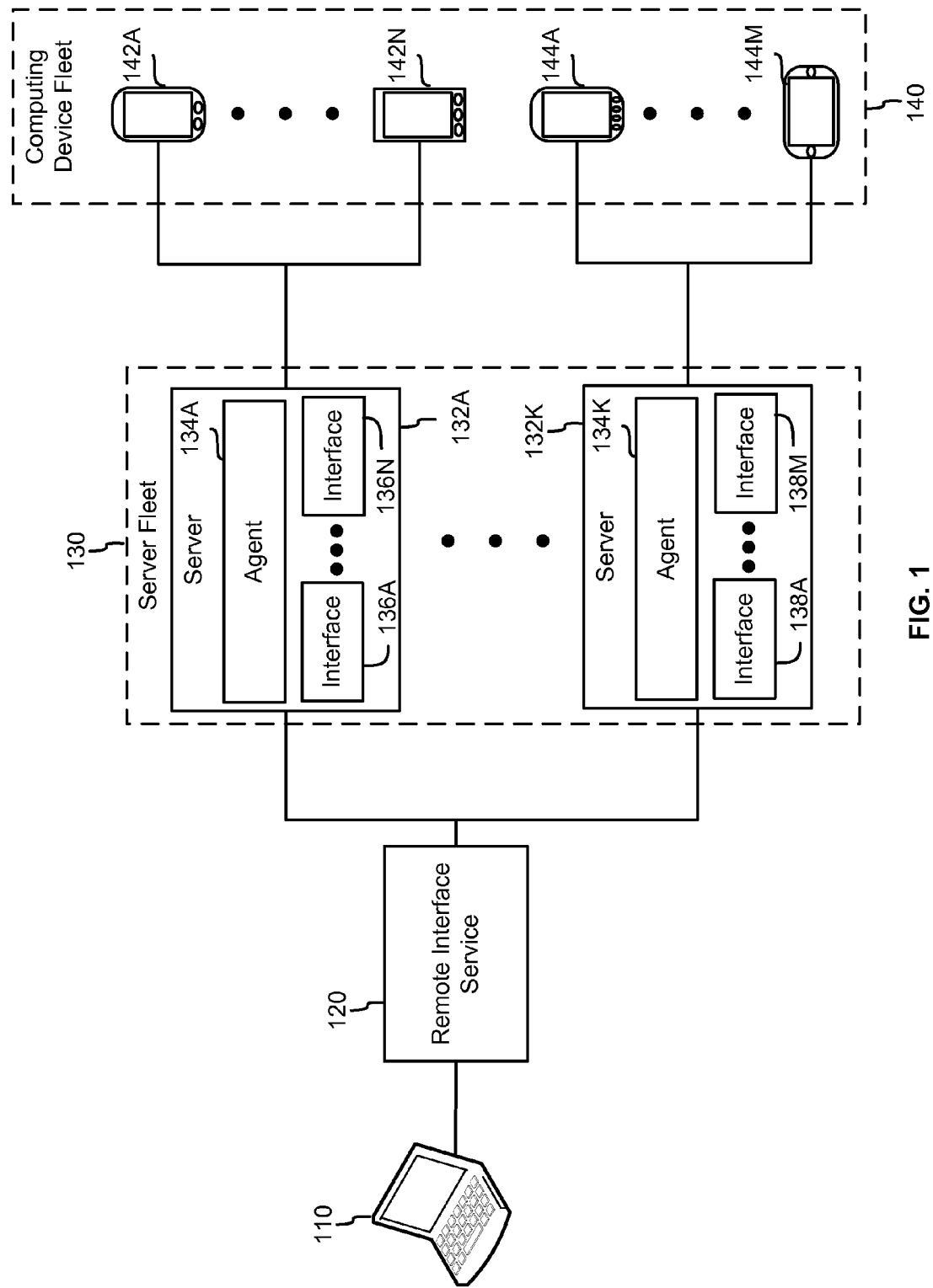
FIG. 1 illustrates an example computing environment for remote interfacing, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques relating to remotely interfacing with different types of computing devices. The remote interfacing may include remotely monitoring and remotely accessing the computing devices in a unified manner, despite the computing devices being of different types. Remotely monitoring may involve receiving information about statuses of the computing devices, including health and states of hardware and software components. Remotely accessing may involve requesting and performing various operations on the computing devices including troubleshooting and sending, over a network, instructions, commands, or scripts for execution. The unified manner may allow an operator to use a common interface for interfacing with any of the computing devices regardless of the underlying type of the computing device. To do so, the embodied techniques may use a remote interface service and an agent. One or more network resources, such as servers, may host the remote interface and the agent. The remote interface may be configured to provide the common interface to the operator, such as a network-based interface, and to route interface requests to the agent. In turn, the agent may translate the received requests into device-specific requests and send these translated requests to the corresponding computing devices. Similarly, when information is received from the computing devices, the agent may format this received information from corresponding device-specific formats into a common format for presentation at the common interface.

By hosting the remote interface service and the agent on one or more network resources rather than the computing devices, various features may be provided. For example, the remote interfacing may be accomplished without modifying any of hardware or software components on the computing devices. In another example, one remote interface and one agent may be sufficient to interface with a large number of computing devices and computing device types. Doing so may avoid the need to have device-specific agents and loading such agents on the corresponding devices and, similarly, the need for device-specific interfaces. Thus, doing so may minimize the impact on the computing devices and may support a large number of computing devices of different types. This may result in a more efficient use of computing resources involved in the remote interface, including network resources, such as servers and databases, and the computing devices.

To illustrate, consider an example of a test environment for testing an application on different types of mobile devices. The test environment may include a server connected to a large number of smartphones and tablets from different manufacturers and having different operating systems. The server may host the agent, which may facilitate remote interfacing to the mobile devices. Another server may host the remote interface service, connect to the test environment server over a network, and provide a web-interface to operators. As such, an operator may access the web-interface and remotely interface with any of the mobile devices in a unified manner. In this way, the operator may ascertain the status of each of the mobile devices and instruct any of the mobile devices to perform an operation from a remote location. For example, if the operator desires to test the application on a particular smartphone, and if the status of that smartphone indicates an issue, the operator may remotely restart the smartphone. Because the remote interface may be provided in a unified manner, the operators' interface to each of the mobile devices need not be device-specific. Instead, the operators' interface can be common across the mobile devices.

In the interest of clarity of explanation, the example test environment is used to illustrate the various embodiments. However, the embodiments are not limited as such. Instead and more generally, the embodiments allow remote interfacing to computing devices, regardless of whether these computing devices are within a test environment or not. More specifically, the remote interfacing may involve using the remote interface service and the agent, which may be hosted on one or more network resources as further described herein below.

Turning to FIG. 1, a computing environment for remotely interfacing with computing devices is illustrated. The computing environment may include a user device 110, a remote interface service 120, a server fleet 130, and a computing device fleet 140. The user device 110 may connect over a network to the remote interface service 120. In turn, the remote interface service 120 and the server fleet 130 may be in communication over a network or a direct point-to-point connection. Similarly, the server fleet 130 and the computing device fleet 140 may be in communication over a network or a direct point-to-point connection. This communication topology between the different components of the computing environment may allow a user, such as a test environment operator, to operate the user device 110 to interface remotely with various computing devices of the computing device fleet in a unified manner.

The user device 110 may represent a user computing device operated by a user to access and use the remote interface service 120. For example, the user device 110 may be any suitable device capable of communicating with the remote interface service 120 over a network, such as, but not limited to, a mobile phone, a smart phone, a personal digital assistant (PDA), a laptop computer, a thin-client device, a tablet, a desktop computer, a set-top box, or other computing device. More particularly, the user device 110 may include a memory, a processor, a user-interface, a network-based application (e.g., a web-service application), and any other suitable feature. The network-based application may be in the form of a web browser, an application programming interface (API), virtual computing instance, or other suitable application.

Figure 3:
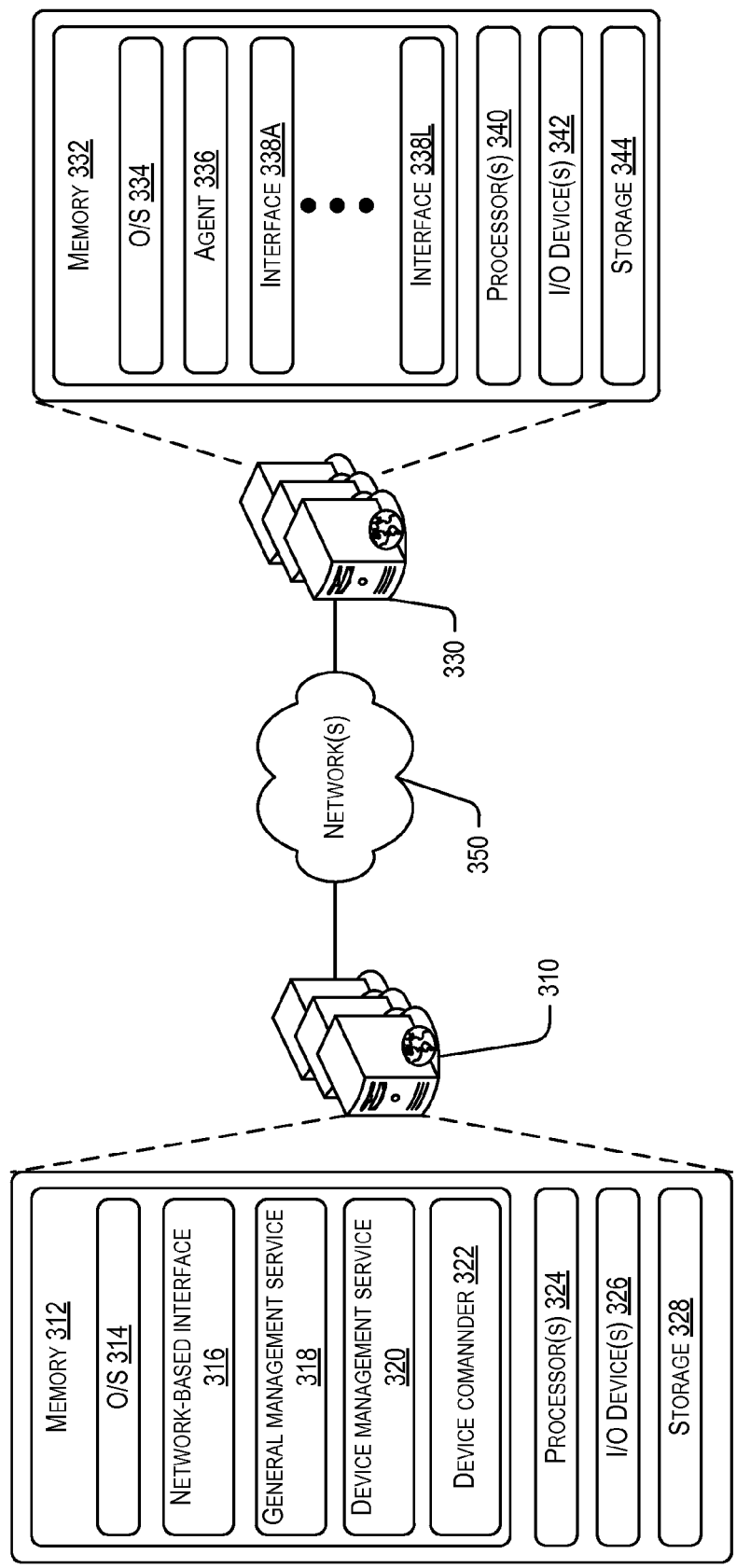
FIG. 3 illustrates an example computing architecture for remote interfacing, according to embodiments.

The remote interface service 120 may represent a computing service hosted on a physical or virtual computing resource. For example, the computing resource may be a physical server, a virtual instance of a server, or any other computing resource. FIG. 3 further illustrates an example of the computing resource. In an embodiment, the computing resource may be a computing node within a network. The network may be part of a test environment.

Figure 2:
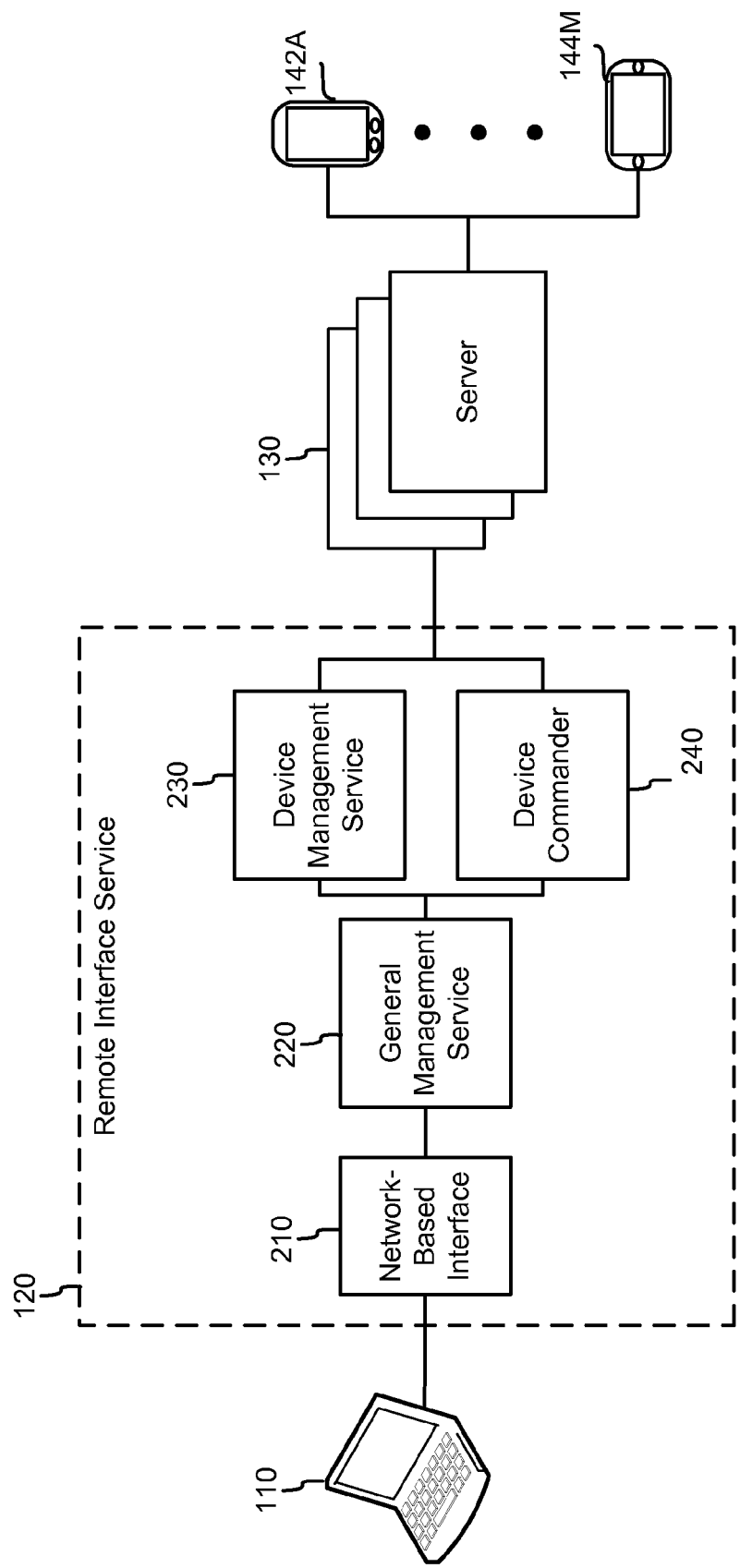
FIG. 2 illustrates an example computing system for remote interfacing, according to embodiments.

The remote interface service 120 is further illustrated in FIG. 2. Briefly, the remote interface service 120 may be accessible to the user device 110 via, for example, a web service application. In an embodiment, the remote interface 120 may provide a common user interface to a user such that the user can remotely interface with any computing device of the computing device fleet 130 in a unified manner. In other words, this interface would provide common functionalities and presentation of information and functionalities to the user regardless of the computing device that the user may be remotely interfacing with.

The remote interfacing may include monitoring individual and aggregated statuses of servers within the server fleet 130 and of computing devices within the computing device fleet 140. A status may indicate a health of a computing device or a server, including associated hardware and software components. For example, the status of the computing device may indicate whether the computing device is on or off, memory metrics (e.g., amount of memory usage), central processing unit metrics (e.g., amount of CPU usage), hardware metrics (e.g., whether an I/O device or peripheral may be available), software metrics (e.g., applications running on the computing device), connectivity statuses (e.g., whether the computing device may be properly connected to the server fleet 130 or a connection bandwidth). Similar status information may also be available for the server. As further illustrated in FIGS. 4-5, the different status information may be visualized or presented at the common user interface at various hierarchical levels, including per computing device, group of computing devices, computing device fleet, server, server fleet, test environment, a plurality of test environments, and other hierarchical levels.

The remote interfacing may also include remotely performing operations on the computing devices of the computing device fleet 130, individually and in groups. For example, in the context of a test environment, the user may remotely troubleshoot any of the computing devices. The troubleshooting can include sending instructions, commands, or scripts for execution. For example, the remote interface service 120 may allow a user a number of remote functions. Any of these functions can be provided on the common user interface as a selectable option. Further, when a function is selected and, accordingly, a computing device executes a corresponding operation, an indication of the execution can be presented on the common user interface. For example, if a user requests a screen shot of a computing device, the captured screen shot may be presented at the common user interface.

One example of provided functions includes remotely visualizing a computing device screen (e.g., take a screen shot by sending a screen shot command). Another example includes streaming computing device logs in real time (e.g., receive logs of the computing device by sending a log stream command). Yet another example includes accessing a list of running processes on the computing device (e.g., get a list of running applications by sending an application-list command). A further example includes terminating or restarting one or more of the processes (e.g., by sending a shut-down or restart command). Another example includes executing arbitrary script against the computing device (e.g., sending a script to perform a particular operation on the computing device such as providing a list of cookies). Yet another example includes remotely rebooting or restarting the computing device (e.g., by sending a reboot command). Another example includes setting a computing device in a certain state (e.g., by sending a state command such as to set a computing device in a maintenance mode). The remote interface service 120 may also implement user-defined access permission based on groups. For example, an administrator may require certain credentials or use an access control list (ACL) for a user to interface remotely with one or a group of particular devices. These and other provided functions are provided herein for illustrative purpose. Other functions may also be provided.

The server fleet 130 may include one or more servers 132A-K. Each of these servers may be a physical computing resource or a virtual computing resource. For example, the server 132A may include a MAC server, while the server 132K may include a Windows server or a Linux server. In an embodiment, the computing resource may be a computing node within a network. The network may be part of a test environment.

Each of the servers 132A-K may be connected to one or more computing devices of the computing device fleet 130.

In an example of a test environment, there may be a large number of servers 132A-K and an even larger number of computing devices. For instance, there may be a hundred or so severs, and each server may be connected to a hundred or so computing devices. Some of the computing devices connected to a same server (e.g., the server 132A) may be of different types, as further described herein below.

To provide a remote interface to computing devices of the computing device fleet 130, each of the servers 132A-K may host an agent and a number of interfaces. As illustrated in FIG. 1, the server 132A may host an agent 134A and interfaces 136A-N. Similarly, the server 132K may host an agent 134K and interfaces 138A-M.

An interface may represent a device-specific interface. Said differently, because two computing devices connected to a same server may be of different types, that server may host one interface specific to the first computing device and another interface specific to the second computing device. Each of these interfaces may allow remote access to the corresponding computing device and may be unique or specific to that computing device. As such, an interface may be uniquely associated with a computing device and may include a device access component, such as a software application, for accessing the computing device. Conversely, two interfaces corresponding to two computing devices of different types may be different, where each may provide a device-specific protocol for accessing the corresponding computing device.

In an embodiment, an interface specific to a computing device may be provided from a manufacturer of the computing device or a provider of the operating system of the computing device. In the example of the test environment, the interface may include an integrated development environment (IDE) or a software development kit (SDK) configured to provide access to the corresponding computing device in a developer mode. For instance, if interfaces 136A and 136N are associated with an iOS-based computing device and an Android-based computing device, respectively, the interface 136A may include XCode while the interface 136N may include Android AIDE.

In comparison, an agent may be common to a plurality of computing devices of different types. As such, a server connected to a plurality of computing devices of different types may host an agent and a plurality of device-specific interfaces corresponding to the plurality of computing devices. That agent may communicate with the plurality of device-specific interfaces to facilitate the common interface to a user (e.g., an operator of the user device 110). For example, as illustrated in FIG. 1, the agent 134A may correspond to the interfaces 136A-N on the server 132A. Similarly, the agent 134K may correspond to the interfaces 138A-M on the server 134K. Other mapping between the number of agent(s) and interfaces may be used. For example, a server may host multiple agents, where each agent may correspond to a plurality of interfaces. In another example, a same agent may be hosted across all of the servers 132A-K and may be common to all of the computing devices of the computing device fleet 130. In this example, the agent 134A and the agent 134K may be instances of a same agent.

As described herein above, an agent (e.g., the agent 134A) may communicate with the plurality of device-specific interfaces (e.g., the interfaces 136A-N) to facilitate the common interface to a user (e.g., an operator of the user device 110). To do so, the agent may also communicate with the remote interface service 120. As such, the agent may sit between the remote interface service 120 and the device-specific interfaces and may be configured to translate data between the remote interface service 120 and the device-specific interfaces. For example, the remote interface service 120 may use a common format for the data, whereas each device-specific interface may use a unique format specific to the corresponding computing device. Accordingly, the agent may be configured to translate the data from the common format to any of the unique formats, and vice versa. Translating data within this context includes mapping raw data (e.g., status information such as messages, heartbeats, screen shots, etc.) and instructions (e.g., commands, scripts, etc.) from one format to another. In an embodiment, the agent (e.g., the agent 134A) may represent an abstraction layer that may sit on top of the device-specific interfaces (e.g., the interfaces 136A-N). As such, the user need not know device-specific formats to be able to interface remotely with any of the computing devices. Instead, the abstraction layer may allow the user to use the common interface across all of the computing devices.

The computing device fleet 140 may include a plurality of computing devices 142A-N and 144A-M. As illustrated in FIG. 1, each group of these computing devices may be connected to a server from the server fleet. The connection may be a wired connection, such as via a universal serial bus (USB), or a wireless connection, such as Wi-Fi or Bluetooth. Further, the connection may be point-to-point. For example, a USB cable may connect a computing device to a USB port or hub of a server. Additionally or alternatively, the connection may also be over a network. For example, a wireless local area network (LAN) may connect a computing device and a server. As illustrated in FIG. 1, the computing devices 142A-N may be connected with the server 134A. Similarly, the computing devices 144A-M may be connected to the server 134K.

When computing devices of different types are connected to a same server, that server may host device-specific interfaces corresponding to the computing devices and an agent common to the device-specific interfaces. For example, the computing device 142A may be an iOS-based computing device, whereas the computing device 142N may be an Android-based device. Accordingly, the interface 136A corresponding to the computing device 142A may include XCode. In comparison, the interface 136N corresponding to the computing device 142N may include Android AIDE. In this case, the agent 134A may include an abstraction layer configured to translate data from iOS and Android unique formats into the common format of the remote interface service 120, and vice versa.

The mappings shown in FIG. 1 between the server fleet 130 and the computing device fleet 140 is for illustrative purpose. Other mappings may be used. For example, one computing device may be connected per server (e.g., in a one-to-one mapping). In another example, multiple computing devices may be connected to one server (e.g., in a one-to-many mapping). In this example, the computing devices may be of different types or of a same type. If the computing devices are of a same type, another server within the server fleet may be similarly connected to other computing devices. In turn, these other computing devices may also be of a same type for that server but of a different type relative to the other computing devices connected to the other server.

In an embodiment, the computing devices 142A-N and 144A-M of the computing device fleet 130 may include various types of mobile devices. A mobile device, in comparison to a conventional computing device, may include a mobile operating system and, in some instances, may allow mobility to the user during at least operation. For example, a mobile device may include a mobile phone, a smart phone, a personal digital assistant (PDA), a phablet, a tablet, a set-top box, a wearable electronic device, and other portable computing devices. On the other hand, a conventional computing device may be stationary, may include larger processing power and memory space than the ones of a portable computing device, and may have an operating system that may be more sophisticated than the one of a portable computing device. A laptop, a personal computer, a desktop computer, and a server are examples of conventional computing devices.

A number of the mobile devices of the computing device fleet 130 may be of different types. Two mobile devices of different types may represent two mobile devices manufactured by a different manufacturer. Additionally or alternatively, two devices of different types may represent two mobile devices with different operating systems or versions of a same operating system. In the test environment example, the computing device fleet 130 may include a large number of mobile devices from different manufacturers and with different operating systems and differing versions of operating systems.

Hence, by using the remote interface service 120 and agents (e.g., the agents 134A-K), a user (e.g., an operator of the user device 110) may remotely interface with the computing devices 142A-N and 144A-M in a unified manner. The user need not know or even be aware of the different device-specific formats for interfacing with these computing devices. Instead, the remote service 120 and the agents provide a common interface to all of the computing devices. Further, by hosting the agents and the device-specific interfaces on the server fleet 130 (or any other location on a network, except the computing device fleet 130), remote interfacing to the computing devices may be provided without requiring changes (e.g., software applications) to the computing devices to enable the interfacing. In other words, the remote interfacing may not be intrusive to the computing devices.

In contrast thereto, prior art systems may be intrusive to computing devices, not support the diverse fleet of computing devices of different types, not support the different remote interfacing functionalities described herein, and may not be as efficient in using the underlying network resources in providing the supported functionalities. For example, certain prior art systems may be specific to particular device types (e.g., may support only one type of a mobile device) and may require an application to be loaded on the supported computing devices to provide minimal remote interfacing functionalities. As such, to interface remotely with two devices of different types using these systems, a user may still need to use two different interfaces and be aware of the device-specific formats.

The drawbacks of the prior art system are further exacerbated in the context of mobile devices. In particular, there may be a large number of operating systems and versions of operating systems resulting in market fragmentation. Further, there may be a large number of hardware, software, and connectivity issues with these mobile devices resulting in troubleshooting challenges. The prior art systems may be tuned to a particular operating system (e.g., may support iOS but not Android, Android but not iOS, but not both Android and iOS). Even for a supported operating system, the troubleshooting may be limited to a subset of an issue type (e.g., getting a list of applications on a mobile device, but not to other software issues and hardware and connectivity issues).

In addition, because there may be a need to support different interfaces for different computing devices and to load different applications on the different devices, prior art system may not as efficiently use underlying network resources. For example, a large number of computing resources should be committed to support the different interfaces. Further, version control systems should be implemented to track for each computing device, the type of the computing device and what application may have been loaded on the computing device.

The components of the computing environment described in FIG. 1 are illustrative. Other configuration of the components may be also used. For example, rather than hosting the remote interface service 120 on a server and an agent on another server, a single server may host both. In another example, the remote interface service 120 may integrate the agent. In yet another example, the server fleet 130 may be part of a test environment, whereas the remote interface service 120 may not be. In this example, there may be multiple test environments, each having one or more server fleets and one or more computing device fleets. The remote interface service 120 may interface with all the different server fleets and may allow a hierarchical representation and access to the different fleets. In yet another example, some or all of the computing devices 142A-K and 144A-M may not be physical devices but, instead, may be virtual devices. A virtual device may include an emulator of a physical device.

Turning to FIG. 2, that figure illustrates example computing components that the remote interface service 120 may implement. In particular, the remote interface service 120 may include a network-based interface 210, a general management service 220, a device management service 230, and a device commander 240. These various components may be implemented as modules, such as computer-readable instructions stored in one or more computer-readable storage media and executed by one or more processors. Collectively, the components may allow a user (e.g., an operator of the user device 110) to remotely interface with any or a group of the computing devices 142A-144M in a unified manner.

The network-based interface 210 may provide a network-based application, such as a web application, an API, or another suitable application accessible from the user device 110. The network-based application may include a user interface configured to display status and other information about the servers 132A-K and the computing devices 142A-144M and provide users with controls to interact with at least the computing devices 142A-144M. The user interface may display the information and the controls in a hierarchical manner, as further illustrated in FIGS. 4-5.

The general management service 220 may represent a backend service configured to process requests from the network-based application. For example, the general management service 220 may facilitate running a query to find information about a particular computing device or a group of computing devices or perform an operation (e.g. taking a screenshot) on the computing device or the group of computing devices. Depending on the type of received request at the network-based application, the general management service 220 may interface with the device management service 230 or the device commander 240. For example, if the request is for status information of a particular computing device, the general management service 220 may interact with the device management service 230 to retrieve and provide this information to the network-based interface 210 for display. In another example, if the request is for executing a command on the particular computing device, the general management service 220 may interact with the device commander 240 to send the command to the computing device and receive an indication of the execution (e.g., receive screen shot data if the command is to take a screen shot). In turn, the general management service 220 may provide this indication to the network-based interface 210 for display (e.g., the network-based interface 210 may display the screen shot).

The device management service 230 may represent a service configured to maintain a real time registry of computing devices and servers statuses and attributes, such as internet protocol (IP) addresses or host names. For example, the device management service 230 may receive status information about the servers 132A-K and the computing devices 142A-144M in real time from the agents 134A-K hosted on the servers 132A-K. In turn, the device management service 230 may store the received information in a data store, such as a database, along with the attributes and identifiers of the servers 132A-K and the computing devices 142A-144M. The device management service 230 may also be configured to perform various operations on the received and stored information. For example, the device management service 230 may support querying the information, aggregate the information following various hierarchical levels, and provide summaries of the information. These functions may allow presenting status information about the servers 132A-K and the computing devices 142A-144M in a hierarchical and interactive manner at the network-based interface 210.

The device commander 240 may be configured to send remote commands to the servers 132A-K and to translate responses. For example, the device commander 240 may send a command for executing a particular operation on a computing device to an agent of a server connected to the computing device. The command sending may cause the agent to interact with the device-specific interface, translate the command into a format specific to the computing device, and accordingly instruct the device to execute the operation. In turn, an indication of the execution (e.g., screen shot data if the command is to capture a screen shot) may be received by the device commander 240 from the agent. The device commander 240 may accordingly format the data for presentation at the network-based interface 210 (e.g., may cause the network-based interface 210 to display the screen short at a certain resolution).

Hence, the various components of the remote interface service 120 may provide a user interface that may be commonly used for the various types of computing devices 142A-144M. As such, status and other information about the computing devices 142A-144M and the servers 132A-K may be presented in a common format. Similarly, selecting operations to be performed on the computing devices 142A-144M and presenting indications about executions of the operations may follow a common format.

Turning next to FIG. 3, an example computing architecture configured to facilitate remote interfacing is shown. The architecture may include a computing resource 310, a computing resource 330, and a network 350. Generally, the computing resource 310 may host the remote interface service 120, whereas the computing resource 330 may represent one or more servers 132A-K. The network 350 may include a private or a public network that may connect the two computing resources 310 and 330.

For example, the network 350 may include any one or a combination of many different types of networks, such as wireless networks, cable networks, cellular networks, radio networks, the Internet, and other private and/or public networks. In an example, the computing resources 310 and 330 may exchange data (e.g., status information, requests for operations, indications of operation executions, etc.) over the network 350.

Turning to the details of the computing resource 310, the computing resource 310 may include one or more service provider computers, such as servers and other suitable computing devices, configured to offer various computing services to users, such as the remote interface service 120. The computing resource 310 may be configured to host a website (or combination of websites) viewable via a user device (e.g., the user device 110). The website may be accessible to the user device via a web browser and may enable the client to request a computing service, such as the remote interface service 120. Additionally or alternatively, the requests may be submitted via API calls.

In embodiments, the computing resource 310 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the computing resource 310 may include one or more servers, perhaps arranged in a cluster, or as individual servers not associated with one another.

In one illustrative configuration, the computing resource 310 may include at least one memory 312 and one or more processing units (or processor(s)) 324. The processor(s) 324 may be implemented as appropriate in hardware, computer-executable instructions, software, firmware, or combinations thereof. Computer-executable instruction, software, or firmware implementations of the processor(s) 324 may include computer-executable or machine-executable instructions written in any suitable programming language to perform the various functions described. The memory 312 may include more than one memory. The memory 312 may store program instructions (e.g., modules implementing the components of the remote interface service 120) that are loadable and executable on the processor(s) 324, as well as data generated during the execution of these programs. Depending on the configuration and type of memory, the memory 312 may be volatile (such as random access memory (RAM)) and/or non-volatile (such as read-only memory (ROM), flash memory, or other memory).

The computing resource 310 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 312 may include multiple different types of memory, such as static random access memory (SRAM), dynamic random access memory (DRAM), or ROM.

Turning to the contents of the memory 312 in more detail, the memory 312 may include an operating system 314 and one or more application programs, modules or services for implementing the features disclosed herein including at least the remote interface service 120. For example, the memory 312 may store a network-based interface module 316 corresponding to the network-based interface 210, a general management service module 318 corresponding to the general management service 220, a device management service module 320 corresponding to the device management service 230, and a device commander module 322 corresponding to the device commander 240.

In some examples, the computing resource 310 may also include additional storage 328, which may include removable storage and/or non-removable storage. The additional storage 328 may include, but is not limited to, magnetic storage, optical disks, and/or tape storage. The disk drives and their associated computer-readable media may provide non-volatile storage of computer-readable instructions, data structures, program modules, and other data for the computing devices. For example, the additional storage 328 may be used as a data store for storing status information.

The memory 312 and the additional storage 328, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors). The modules of the server 310 may include one or more components. The computing resource 310 may also include I/O device(s) and/or ports 326, such as for enabling connection with a keyboard, a mouse, a pen, a voice input device, a touch input device, a display, speakers, a printer, or other I/O device.

Turning to the details of the computing resource 330, the computing resource 330 may include similar components as the ones of the computing resource 310. In the interest of clarity of explanation, the similarities are not repeated herein. In an embodiment, the computing resource 330 may include at least one memory 332 and one or more processing units (or processor(s)) 340, I/O devices 342, and storage 344. The memory may include an operating system 334, an agent module 336, and interface modules 338A-L. The agent module may correspond to any or all of the agents 134A-K. Similarly, the interface modules 338A-L may correspond to any or all of the interfaces 136A-N and 138A-M.

Figure 4:
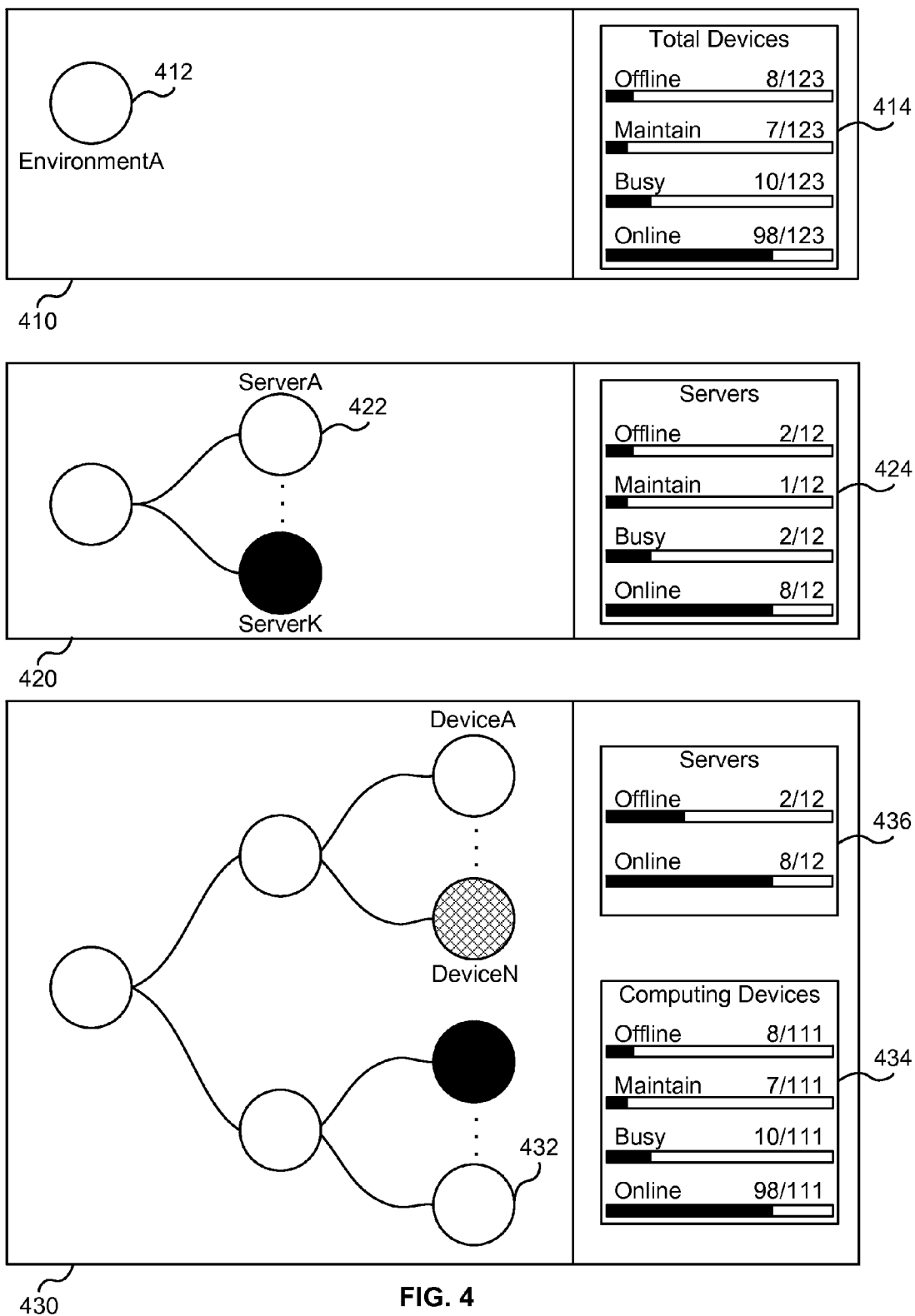
FIG. 4 illustrates example user interfaces, according to embodiments.
Figure 5:
FIG. 5 illustrates an example user interface, according to embodiments.

The various embodiments of FIG. 3 are illustrative. Other embodiments may also be used. For example, the agent module 336 may be hosted on the computing resource 310. In another example, one or more of the modules 316-322 may be hosted on the computing resource 330. In yet another example, both of the computing resources 310 and 330 may be hosted as one or more virtual instances. The various embodiments may provide remote interfacing capabilities in a unified manner to a plurality of diverse computing devices. FIGS. 4 and 5 further illustrate examples of user interfaces that may be facilitated by the various embodiments.

Turning to FIGS. 4 and 5, graphical user interfaces (GUIs) for remotely interfacing with computing devices are illustrated. For example, the GUIs may be provided by the network-based application 210 and may be presented at a browser or another application running on a user device (e.g., the user device 110). Generally, a GUI may include multiple fields. Some fields may be used to present data in real time, such as status information. Other fields may be used to present selectable options. The selectable options may allow real time user interactivity, including options to request operations and options to request particular information. The interactivity may include a hierarchical presentation of different levels. At a high level, data about one or more test environments may be presented, as illustrated in a portion of FIG. 4. At a low level, data about individual computing devices may be presented, as illustrated in FIG. 5.

More particularly, a GUI 410 of FIG. 4 may present data about a test environment. Although one test environment is illustrated, data about a larger number of test environments may also be presented. The presented data may include a visual representation 412 of the test environment, such as an icon or another graphical component. The visual representation 412 may identify the test environment and use a color code (or some other presentation format) to indicate an overall status of the test environment. The presented data may also include a visual summary 414 of the status of the test environment. For example, the visual summary 414 may include a list summarizing the number of servers and computing devices of the test environment, percentage(s) of servers and computing device(s) available, and other information. The visual summary 414 may also use a color code or some other presentation format to indicate a status. For example, red can indicate that one or more computing devices may be offline, green may indicate that one or more computing devices may be online and available, blue may indicate that one or more computing devices may be online but busy, gray may indicate that one or more computing devices may be online but in a maintenance mode, and so on. Other presentation formats may be used, such as using a square, circle, star, rectangle, etc., to indicate the different statuses.

In comparison, a GUI 420 may indicate a second hierarchical level. This level may represent the different servers in the test environment. For example, by selecting (e.g., double-clicking on) the visual representation 412 or a portion of the visual summary 414, the GUI 410 may be refreshed. As refreshed, the GUI 410 may be presented as the GUI 420. In turn, the GUI 420 may include a visual representation 422 identifying the different servers and a visual summary 424 summarizing statuses of the different servers.

A GUI 430 may indicate a third hierarchical level. This level may represent the different computing devices in the test environment. In an example, all of the computing devices may be shown along with which servers that may be connected to. In another example, only the computing devices may be shown but not the servers. In yet another example, the computing devices connected to certain servers may be shown. For instance, when a server from the visual summary 412 is selected, the GUI 420 may be refreshed. As refreshed, the GUI 420 may be presented as the GUI 430.

The GUI 430 may include a visual representation 432 identifying the different computing devices and, as applicable, servers. The GUI 430 may also include a visual summary 434 summarizing statuses of the different computing devices. Additionally, the GUI 430 may include a second visual summary 436 summarizing statuses of servers, as applicable. Based on selecting a particular computing device, the GUI 430 may be refreshed to present information specific to that computing device. As refreshed, the GUI 430 may be presented as a GUI 510.

The GUI 510 may present various types of data about a particular device. As such, the GUI 510 may correspond to another hierarchical level. For example, the GUI 510 may present identifiers 512 of the computing device, the connected-to server, the test environment, associated statuses, and associated attributes (e.g., operating system versions, serial number, hardware version, etc.). The GUI 510 may also present real time logs of the computing device. In addition, the GUI 510 may present various selectable options 516 to request operations for execution on the computing device. As illustrated, the selectable options 516 may include restarting the computing device, getting a list of running applications, selecting a particular application, shutting-down that particular application, and receiving a screen shot of the computing device. Other types of operations and corresponding selectable options may be presented.

In addition to enabling selections, the different GUIs may use other forms of interactivity. For example, the GUIs may support filtering. A user may be capable of setting certain filters, such as a filter for presenting information about computing devices or servers with a particular status (e.g., offline), or a certain type of computing devices (e.g., Android-based mobile devices), and other filters.

Further, because certain computing devices may support certain operations that other computing devices may not support, the selectable options and the various presented data and attributes associated with computing devices may vary between GUIs. For example, one computing device may support a screen shot, while another one may not do so. In this example, the GUI presented in association with the first computing device may have a selectable option of taking screen shot. In comparison, the GUI presented in association with the second computing device may not present this selectable option or may present the option but, as presented, the option may not be selectable (e.g., may be grayed out).

In addition, the GUIs may be extensible. For example, when a previously unsupported operation on a computing device becomes supported, a corresponding selectable option may be added to the GUI 510. Extending the GUIs may include updating the remote interface service 120 and the agents 132A-K to support the new operation.

Hence, by using an interactive GUI, different data may be presented at various hierarchical levels. Regardless of the underlying types of the computing devices (and the servers), a user may be capable of remotely interfacing with the computing devices in a unified manner. In other words, the user need not know device-specific formats to interface with the computing devices. Instead, the user can use the same GUI for the different computing devices.

As described herein above, a user may operate a user device to access the network-based interface 210 of the remote interface service 120. By using a GUI, such as the ones described herein above, the user may accordingly remotely interface with any or a group of the computing devices of the computing device fleet 130. To facilitate the user's remote interface, the remote interface service 120 may interact with the agents 134A-K hosted on the servers 132A-K. The interaction may include receiving status information and requesting operations to be performed in real time. In particular, the remote interface service 120 may store the status information in a data store to support querying and generating different report types. In comparison, requesting the operations may include sending the requests to the agents 134A-K and receiving from the agents 134A-K indications that the operations may have been executing on the associated computing devices. Accordingly, the agents 134A-K may interact with device specific interfaces (e.g., the interfaces 136A-N and 138A-M) to receive the status information, request the operations, and provide the execution indications. These and other features are further shown in FIGS. 6-8, illustrating different flows that the remote interface 210 and the agents 134A-K may implement.

Figure 6:
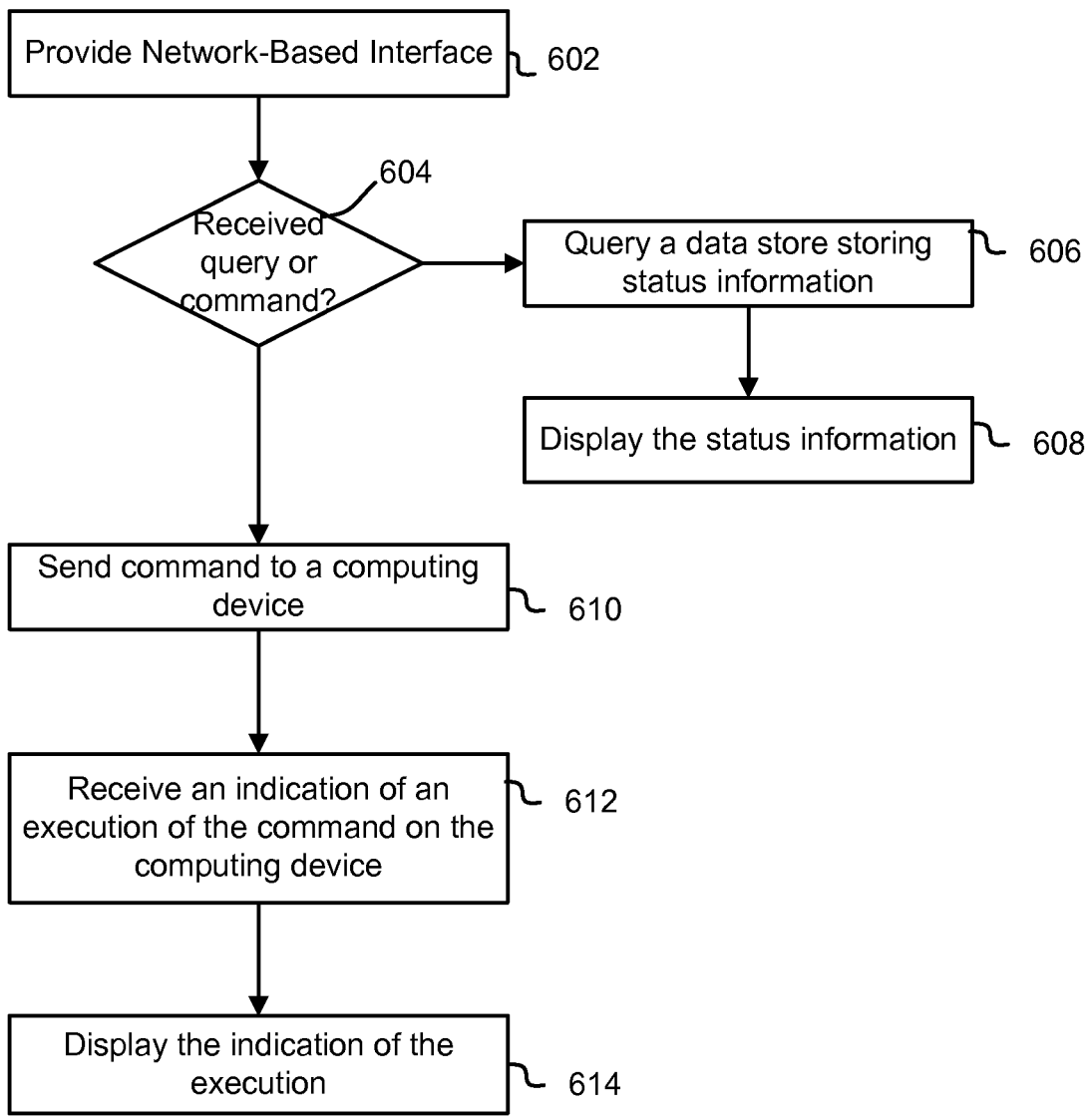
FIG. 6 illustrates an example flow for remote interfacing, according to embodiments.
Figure 7:
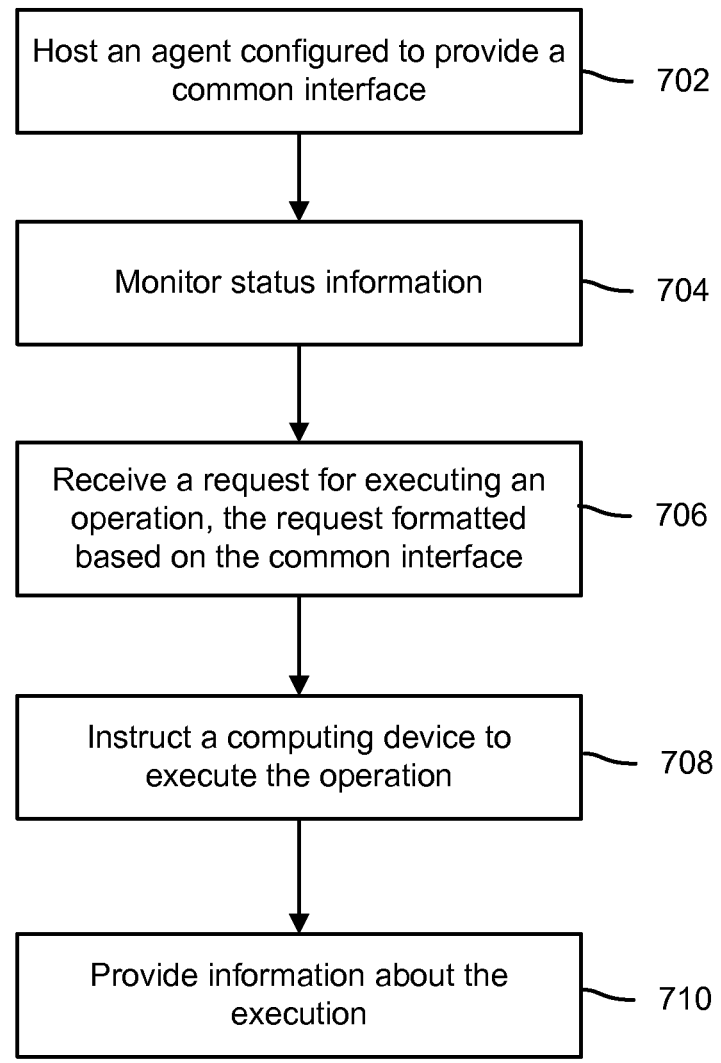
FIG. 7 illustrates an example flow for facilitating a common interface to computing devices, according to embodiments.
Figure 8:
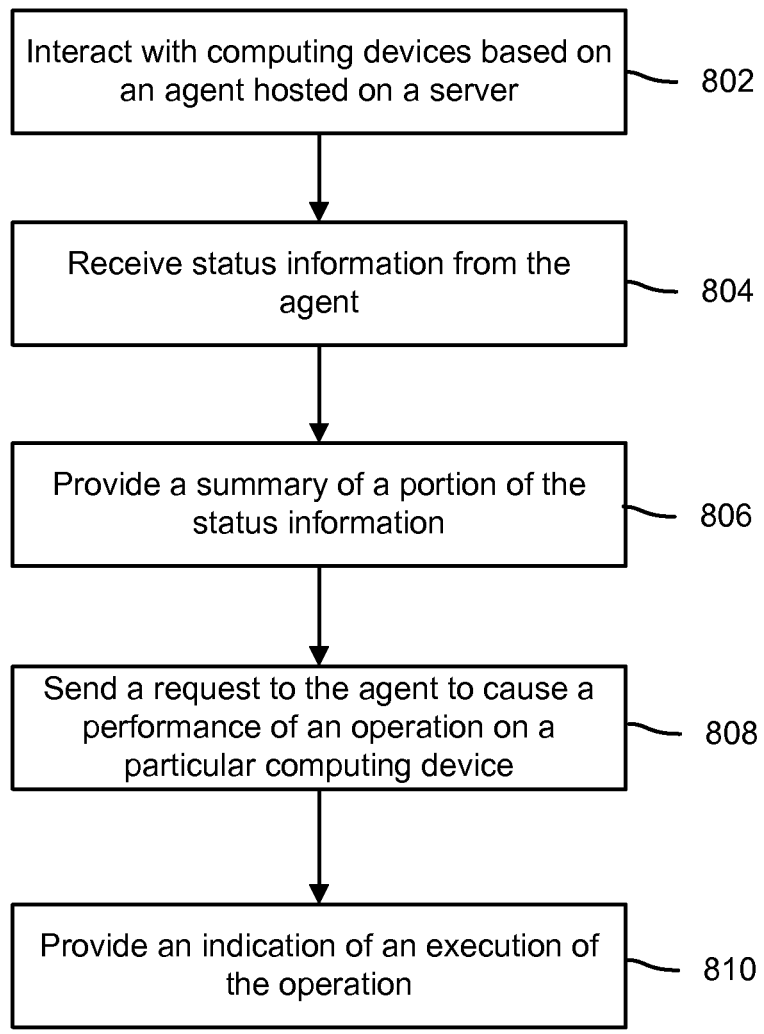
FIG. 8 illustrates an example flow for remotely interfacing with computing devices based on a common interface, according to embodiments.

FIGS. 6-8 illustrate example flows for remote interfacing with computing devices. FIG. 6 illustrates an example flow for providing a user interface to enable remote interfacing for a user. In comparison, FIG. 7 illustrates an example flow for using an agent, such as one or more of the agents 134A-K, to facilitate the remote interfacing. FIG. 8 illustrates an example flow for using a remote interface service, such as the remote interface service 120, to facilitate the remote interfacing. Some of the operations of the example flow of FIG. 6 may be further embodied in operations of the example flows of FIGS. 7 and 8. Thus, some operations may be similar. Such similarities are not repeated herein in the interest of clarity of explanation.

Further, in the illustrative operations, some of the operations or functions may be embodied in, and fully or partially automated by, modules executed by one or more processors. For example, the remote interface service 120 and one or more of the agents 134A-K may be configured to perform one or more of the operations. Nevertheless, other or a combination of other computing devices and modules may be additionally or alternatively used. Additionally, while the operations are illustrated in a particular order, it should be understood that no particular order is necessary and that one or more operations may be omitted, skipped, and/or reordered.

The example flow of FIG. 6 may start at operation 602, where a network-based interface may be provided to a user device over, for example, a network. The network-based interface may be a component of a remote service interface hosted on a computing resource, such as the network-based interface 210. In an example, the network-based interface may present a GUI, where status information and selectable options may be presented.

At operation 604, a request may be received at the network-based interface and a determination may be made as to whether the request may include a query for status information or a command for an operation execution. For example, a general management service of the remote interface service, such as the general management service 220, may perform the determination based on, for example, an input or a selection of an option received at the network-based interface. If the request is for a query, operation 606 may be performed for querying the status information. Otherwise, operation 610 may be performed for sending the command.

At operation 606, a data store storing the status information may be queried. For example, a device management service of the remote interface service, such as the device management service 230, may query the data store. The querying may include returning status information in different formats, including aggregation, summaries, or other reports generated from the status information.

The status information may include logs, memory metrics, central processing unit metrics, hardware metrics, and connectivity statuses of computing devices. Similar status information may also be stored and queried for servers that the computing devices may be connected to. In an embodiment, the device management service may receive the status information from one or more agents hosted on the servers and store the received information in the data store, along with attributes of the computing devices and servers. In an example, the information may be received in real time. In another example, the device management service may request the information from the one or more agents at time intervals, or the one or more agents may automatically send the information at time intervals. In yet another example, the one or more agents may monitor changes to the status information from the computing devices. Any time a change may be detected, an associated agent may transmit the associated status information to the device management service. In a further example, the one or more agents may use a set of criteria, such as threshold-based criteria. Any time an agent detects a change that meets a criterion (e.g., a power level of a mobile device battery going below a threshold), the agent may transmit the associated status information to the device management service. In turn, the device management service may generate an alert or a notification that may be presented at the network-based interface.

Monitoring the status information may not only be passive (e.g., reading and providing the status information for presentation). Instead, the monitoring may further include interactivity, some of which may represent commands for execution. For example, based on the status information of a computing device or of a server, a command may be generated to put that computing device or server in a certain state (e.g., to enter a maintenance mode).

At operation 608, the status information or a portion of the status information may be displayed. For example, in response to the query, a summary of the status information may be presented at the network-based interface.

At operation 610, a determination may have been made that the received request is for a command to execute an operation. Accordingly, the command may be sent to a computing device causing the computing device to execute the operation. In the interest of clarity of explanation, an example of a single computing device is illustrated at operations 610-614. However, the request may be associated with a group of computing devices. As such, the command may be sent to one or more requested computing devices. In an example, the command may include one or more of a screen shot command, a real time log stream command, a device restart command, a device shut-down command, an application start command, and application shut-down command, or a script execution command.

Sending the command may include multiple steps. For example, a device commander of the remote interface service, such as the device commander, may identify the requested computing device from the request and the associated server from the data store. Accordingly, the device commander may send the command to an agent hosted on the associated server. In turn, the agent may format the command into a format specific to the requested computing device and may send the formatted command to the requested computing device causing the request computing device to perform the operation.

At operation 612, an indication of an execution of the command on the computing device may be received. For example, the agent from operation 610 may receive data from the computing device indicating that the operation may have been performed. For instance, if the command requested a screen shot, the agent may receive screen shot data from the computing device. In turn, the agent may provide the data to remote service interface for presentation at the network-based interface.

At operation 614, the indication of the command execution may be displayed. For example, the network-based interface may receive the data indicating that the computing device performed the operation and may present the data. To illustrate, the network-based interface may present the screen shot of the computing device if the command requested the screen shot.

Turning to FIG. 7, an example flow for using an agent to facilitate remote interfacing is illustrated. In the interest of clarity of explanation, an example of a single agent hosted on a server is illustrated. However, the example flow may similarly apply to a larger number of agents hosted on a same server, or to instances of a single agent hosted on a plurality of servers.

The example flow of FIG. 7 may start at operation 702, where an agent configured to provide a common interface may be hosted on a server. The server may be connected to computing devices of different types. Each of the computing devices may be associated with a device-specific interface that may allow access to the computing device. The server may host the different device-specific interfaces. The common interface provided by the agent may be based on the different device-specific interfaces. For example, the common interface may allow the agent to translate data (e.g., status information and commands) from formats specific to each of the computing devices (e.g., formats based on the device-specific interfaces) to a common format of the common interface, and vice versa.

At operation 704, status information about the computing devices may be monitored. For example, the agent may monitor this information in real time, at time intervals, based on a detected change, or against a set of criteria. The monitoring may include receiving statuses of hardware and software components of the computing devices. The status information received from one computing device may be in a format specific to that computing device and different from the format of status information received from a second computing device. Accordingly, the agent may reformat the received status information from the device-specific formats into the common format. The agent may also send the status information, formatted using the common format, to a remote interface service for storage at a data store.

At operation 706, a request for executing an operation may be received. The request may be formatted according to the common format of the common interface. For example, the request may be received by the agent from the remote interface service. The request may identify a computing device and the operation to be executed. In turn, the agent may identify the computing device, format the request from the common format into a command with a format specific to that computing device, and send the formatted command to the computing device causing the computing device to perform the operation. In the interest of clarity of explanation, a single computing device is illustrated at operations 706-710. However, these operations may similarly be performed for a plurality of computing devices. For example, if the request is associated with two computing devices of different types, the agent may generate two commands, each of which may be formatted according to the corresponding device-specific format and sent to the corresponding computing device.

At operation 708, the computing device may be instructed to execute the operation. For example, the agent may send the command, formatted according to the device-specific format, to the computing device for execution. At operation 710, information about the execution of the operation may be provided. For example, the agent may receive data from the computing device indicative of the execution (e.g., if the command is for a screen shot capture, the received data may include screen shot data). Because this data may be formatted according to the device-specific format, the agent may translate the data into the common format. The agent may also send the formatted data to the remote interface service for presentation or for storage at the data store.

Turning to FIG. 8, an example flow for using a remote interface service to facilitate remote interfacing is illustrated. The remote service interface may be hosted on a computing resource and may interact with an agent hosted on a server. The server may be connected to computing devices of different types. In the interest of clarity of explanation, an example of a single remote interface, single agent, and a single server is illustrated. However, the example flow may similarly apply to a larger number of remote service interfaces, agents, or servers.

The example flow of FIG. 8 may start at operation 802, where the remote interface service may interact with the computing devices of different types based on the agent hosted on the server. The server may also host device-specific interfaces based on the types of the computing devices. The agent may provide a common interface to interact with the device-specific interfaces.

At operation 804, status information may be received from the agent. For example, the remote interface service may receive the status information in real time, at time intervals, based on a detected change, or based on a set of criteria. The status information may be associated with the different computing devices and the server. Some of the computing devices may be of different types and, thus, may utilize device-specific formats for reporting status information to the agent. As such, the agent may have formatted the corresponding information from the device-specific formats into a common format of the common interface. The remote interface service may also store the received status information in a data store along with attributes of the data store and the server.

At operation 806, a summary of a portion of the status information may be provided. For example, the status information may be presented at a network-based interface of the remote interface service. Thereafter, based on receiving a selection of a particular device, a device management service of the remote data service may query the data store and retrieve status information specific to the particular computing device. The retrieved information may be then presented at the network-based interface.

At operation 808, a request may be sent to the agent to cause a performance of an operation on a particular computing device. For example, a device commander of the remote interface service may identify the computing device from the request and accordingly send the request to the agent. The request may follow the common format of the common interface. Although the request may be associated with a plurality of computing devices, in the interest of clarity of explanation, a single computing device is illustrated at operations 808-810. In turn, the agent may translate the request from the common format to the corresponding device-specific format to generate a command and may send the command to the computing device. The received command may cause the computing device to execute the operation and to provide an indication of the execution to the agent (e.g., if a screen shot is requested, the computing device may send screen shot data to the agent). Because this data may be formatted according to the device-specific format, the agent may translate the data into the common format and send the formatted data to the remote interface service.

At operation 810, an indication of the execution of the operation may be provided. For example, upon receiving the formatted data from the agent, the remote interface service may present or store a portion the formatted data. To illustrate, if the request is for a screen shot, the network-based interface may present the screen shot. The presented screen shot may be further formatted to according to parameters of the network-based interface's GUI, such as a desired presentation resolution.

Figure 9:
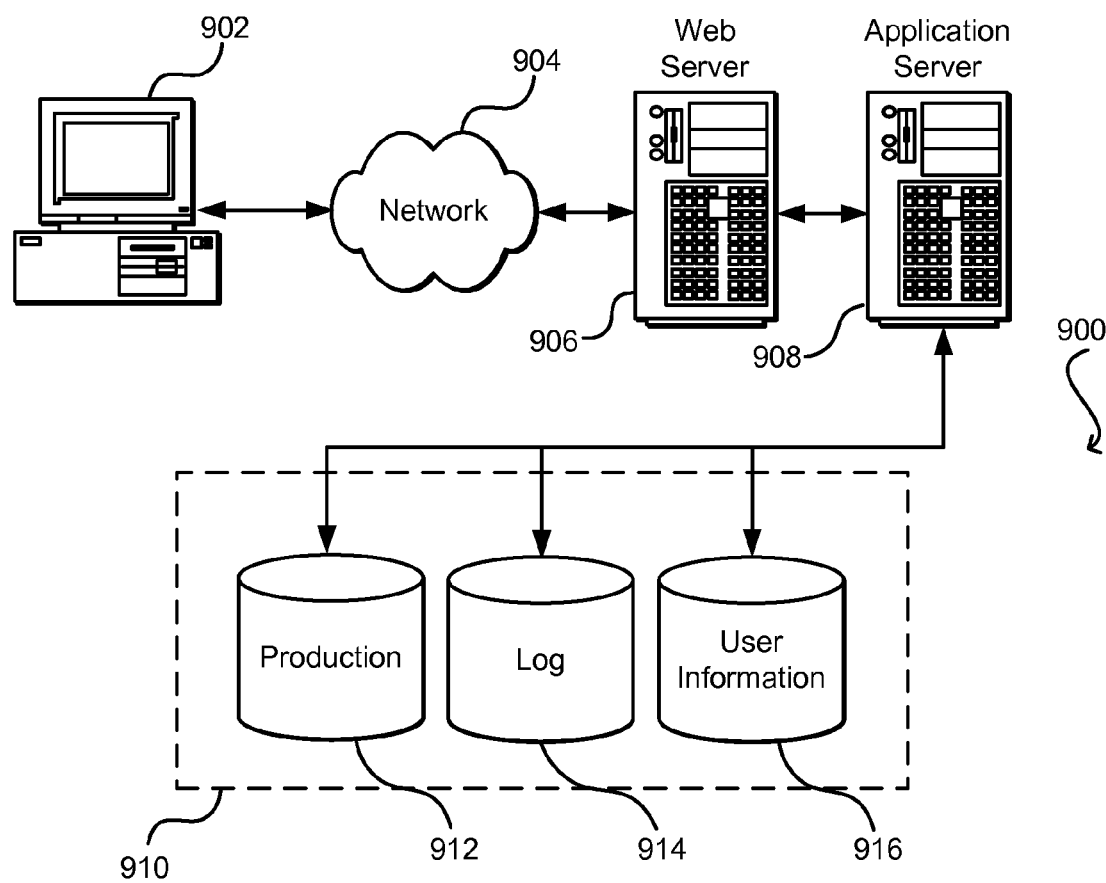
FIG. 9 illustrates an environment in which various embodiments can be implemented.

Turning to FIG. 9, the figure illustrates aspects of an example environment 900 capable of implementing the above-described structures and functions. As will be appreciated, although a Web-based environment is used for purposes of explanation, different environments may be used, as appropriate, to implement various embodiments. The environment includes an electronic client device 902, which may include any appropriate device operable to send and receive requests, messages, or information over an appropriate network(s) 904 and convey information back to a user of the device. Examples of such client devices include personal computers, cell phones, handheld messaging devices, laptop computers, set-top boxes, personal data assistants, electronic book readers, or any other computing device. The network(s) 904 may include any appropriate network, including an intranet, the Internet, a cellular network, a local area network or any other such network or combination thereof. Components used for such a system may depend at least in part upon the type of network and/or environment selected. Protocols and components for communicating via such a network are well known and will not be discussed herein in detail. Communication over the network may be enabled by wired or wireless connections and combinations thereof. In this example, the network includes the Internet, and the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there may be several application servers, layers, or other elements, processes or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server may include any appropriate hardware and software for integrating with the data store as needed to execute aspects of one or more applications for the client device, handling a majority of the data access and business logic for an application. The application server 908 provides access control services in cooperation with the data store 910, and is able to generate content such as text, graphics, audio files and/or video files to be transferred to the user, which may be served to the user by the Web server in the form of HTML, XML or another appropriate structured language in this example. The handling of all requests and responses, as well as the delivery of content between the client device 902 and the application server 908, may be handled by the Web server 906. It should be understood that the Web and application servers 906 and 908 are not required and are merely example components, as structured code discussed herein may be executed on any appropriate device or host machine as discussed elsewhere herein.

The data store 910 may include several separate data tables, databases or other data storage mechanisms and media for storing data relating to a particular aspect. For example, the data store 910 illustrated includes mechanisms for storing production data 912 and user information 916, which may be used to serve content for the production side. The data store 910 is also shown to include a mechanism for storing log data 914, which may be used for reporting, analysis, or other such purposes. It should be understood that there may be many other aspects that may need to be stored in the data store 910, such as for page image information and to access correct information, which may be stored in any of the above-listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user, and may access the catalog detail information to obtain information about items of that type. The information then may be returned to the user, such as in a results listing on a web page that the user is able to view via a browser on the client device 902. Information for a particular item of interest may be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of environment 900 in FIG. 9 should be taken as being illustrative in nature, and not limiting to the scope of the disclosure.

The various embodiments further may be implemented in a wide variety of operating environments, which in some cases may include one or more user computers, computing devices or processing devices which may be used to operate any of a number of applications. User or client devices may include any of a number of general purpose personal computers, such as desktop or laptop computers running a standard operating system, as well as cellular, wireless and handheld devices running mobile software and capable of supporting a number of networking and messaging protocols. Such a system also may include a number of workstations running any of a variety of commercially available operating systems and other known applications for purposes such as development and database management. These devices also may include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network may be, for example, a local area network, a wide-area network, a virtual private network, the Internet, an intranet, an extranet, a public switched telephone network, an infrared network, a wireless network, and any combination thereof.

In embodiments utilizing a Web server, the Web server may run any of a variety of server or mid-tier applications, including HTTP servers, FTP servers, CGI servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also may include a computer-readable storage media reader, a communications device (e.g., a modem, a network card (wireless or wired), an infrared communication device, etc.) and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, may include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which may be used to store the desired information and which may be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computing system to remotely monitor and troubleshoot a plurality of computing devices, the computing system comprising:
    a first computing resource communicatively connected to a group of mobile devices under test and hosting device access components and an agent, wherein:
        a device access component is specific to a mobile device from the group, comprises an integrated development environment (IDE) or a software development kit (SDK) specific to a mobile operating system of the mobile device, is configured at least to provide access to the mobile device and is hosted on the first computing resource remotely from the mobile device, the access to the mobile device associated with testing functionalities of the mobile device independently of a device agent installable on the mobile device for the testing, and
        the agent is configured at least to access the mobile devices in the group based at least in part on the device access components, the agent comprises an abstraction layer that mediates the device access components and that translates between formats specific to the device access components and a common format; and
    a second computing resource communicatively connected to the first computing resource and hosting a common interface and a service, the common interface configured at least to utilize the common format to invoke testing of mobile device functionalities across different types of mobile operating systems of the group of mobile devices, the service configured at least to monitor and troubleshoot the mobile device functionalities by at least:
        communicating with the agent to receive status information about the mobile device under test, the status information formatted in the common format based at least in part on the abstraction layer of the agent,
        storing the status information in a data store,
        providing, via the common interface, a summary for visual presentation of a portion of the status information from the data store,
        receiving, via the common interface, an access command directed to the group of mobile devices and formatted based at least in part on the common format of the common interface,
        sending the access command to the agent to access the mobile devices in the group based at least in part on translations of the access command to device-specific commands by the abstraction layer of the agent,
        receiving access information from the agent based at least in part on the device-specific commands, the access information formatted in the common format based at least in part on the abstraction layer of the agent, and providing, via the common interface, an indication for visual presentation of at least a portion of the access information.

2. The computing system of claim 1, wherein the first computing resource and the second computing resource are configured to provide a test environment that comprises the mobile device and at least one other mobile device, wherein the mobile device and the at least one other mobile device have different mobile operating systems, wherein the first computing resource is communicatively connected with the other mobile device and hosts another device access component specific to the other mobile device, and wherein the agent is further configured to support the common interface and access the other mobile device based at least in part on the other device access component.

3. The computing system of claim 1, wherein the service is further configured to:
store information about a status of the first computing resource received from the agent in the data store; and
include the information about the status in the summary.

4. The computing system of claim 3, wherein the status information comprises at least one of: logs, memory metrics, central processing unit metrics, hardware metrics, or connectivity statuses of at least the mobile device, and wherein the access command comprises at least one of: a screen shot command, a real time log stream command, a device restart command, a device shut-down command, an application start command, an application shut-down command, a mobile device state command, or a script execution command.

5. The computing system of claim 1, wherein the common interface is configured to present a user interface element representing the group of mobile devices and individual user interface elements representing the respective mobile devices, wherein the user interface element is configured to invoke a status request or a command request specific the group of mobile devices, and wherein an individual user interface element is configured to invoke a status request or a command request specific to one of the mobile devices.

6. The computing system of claim 1, wherein the service is further configured to:
determine whether a user request is for the status information or for the access command;
based at least in part on a determination that the user request is for the status information, invoke a device management service configured to maintain a real time registry of identifiers, statuses, and attributes of mobile devices and servers and to aggregate the status information based on heretical levels corresponding to a hierarchy of the mobile devices and servers; and
based at least in part on a determination that the user request is for the access command, invoke a device commander configured to send access commands in the common format to the agent and to format received access information in the common format.

7. A computer-implemented method comprising:
hosting, on a computing node communicatively connected with at least a computing device under test and having an operating system, an agent and an interface, wherein:
the interface is specific to the operating system of the computing device, is configured to interact with the operating system based at least in part on a format specific to the operating system, and is hosted on the computing node remotely from the computing device,
interactions of the interface with the operating system of the computing device are associated with testing functionalities of the computing device independently of a device agent installable on the computing device for the testing,
the agent is configured at least to access the computing device based at least in part on the interface,
the agent comprises an abstraction layer that mediates the interface and that translates between the format specific to the operating system and a common format of a common interface,
the common interface is configured at least to utilize the common format to invoke testing of computing device functionalities across different types of operating systems of computing devices based at least in part on input from an end user device at the common interface;
monitoring status information associated with at least the computing device at least in part by utilizing the common interface, the monitoring comprising:
generating, based at least in part on the abstraction layer of the agent, the status information in the common format from information received from the computing device in the format specific to the operating system; and
providing the status information for presentation.

8. The computer-implemented method of claim 7, further comprising hosting, on the computing node, another interface specific to another computing device having a different operating system, wherein the computing node is communicatively connected with the other computing device, wherein the agent is further configured to support the common interface based at least in part on the other interface specific to the other computing device, wherein the computing device comprises a first mobile device, wherein the other computing device comprises a second mobile device, and wherein the operating system and the different operating system are provided by different providers.

9. The computer-implemented method of claim 8, wherein the interface comprises a first application to access the first mobile device in a first development mode, wherein the other interface comprises a second different application to access the second mobile device in a second development mode.

10. The computer-implemented method of claim 8, wherein monitoring the status information comprises:
receiving, by the agent, data indicative of statuses of hardware and software components of the first mobile device and the second mobile device, a first portion of the data received from the first mobile device and formatted in the format specific to the operating system based at least in part on the interface, a second portion of the data received from the second mobile device and formatted in a different format based at least in part on the other interface;
generating, by the agent, the status information based at least in part on formatting the first portion and the second portion of the data according to the common format of the common interface; and
providing the status information for storage at a data store.

11. The computer-implemented method of claim 7, further comprising:
receiving a request for executing an operation on the computing device, the request formatted based at least in part on the common format of the common interface;
instructing the computing device to execute the operation based at least in part on the request; and providing information about an execution of the operation on the computing device.

12. The computer-implemented method of claim 11, wherein instructing the computing device to execute the operation comprises:
   determining, by the agent, whether the request is associated with the computing device or another computing device;
   generating, by the agent, an execution instruction from the request based at least in part on the determining, the execution instruction formatted based at least on the format specific to the operating system if the request is associated with the computing device, and the execution instruction formatted differently based at least on another format of another interface specific to the other computing device if the request is associated with the other computing device; and
   sending the execution instruction to the computing device or the other computing device based at least in part on the determining.

13. The computer-implemented method of claim 11, wherein monitoring the status information comprises providing health information specific to the computing device and at least one other computing device and an aggregation of the health information to a level of the computing node, and wherein instructing the computing device comprises at least one of: sending an execution instruction specific to the computing device or sending a common execution instruction to both the computing device and the other computing device.

14. A non-transitory computer-readable storage medium storing instructions that, when executed at a computing node, collectively configure the computing node to perform operations comprising:
   interacting with at least a computing device under test and having an operating system, wherein:
      the interacting is based at least in part on utilizing an agent hosted on a computing resource,
      the computing resource is communicatively connected with the computing node and the computing device,
      the agent is configured at least to access the computing device based at least in part on an interface and to support a common interface,
      the agent comprises an abstraction layer that mediates the interface and that translates between a format specific to the operating system of the computing device and a common format of the common interface,
      the interface is specific to the operating system of the computing device, is configured to test functionalities of the computing device by at least interaction with the operating system based at least in part the format specific to the operating system and independently of a device agent installable on the computing device for testing the functionalities, and is hosted on the computing resource remotely from the computing device, and
      the common interface is configured at least to utilize the common format to invoke testing of computing device functionalities across different types of operating systems based at least in part on input from an end user device at the common interface;
   sending a request to the agent to cause performance of an operation on the computing device, the request formatted based at least in part on the common format of the common interface, the request causing the agent to translate, based at least in part on the abstraction layer of the agent, the request from the common format to the format specific to operating system of the computing device, the request formatted in the format causing the computing device to execute the operation; and
   providing an indication for visual presentation of an execution of the operation on the computing device.

15. The non-transitory computer-readable storage medium of claim 14, wherein the instructions when executed on the computing node further configure the computing node to perform operations comprising:
   receiving, from the agent, status information about a plurality of computing devices comprising the computing device, the status information formatted based at least in part on the common format of the common interface; and
   providing a summary for visual presentation of a portion of the status information.

16. The non-transitory computer-readable storage medium of claim 15, wherein the summary is presented on the common interface, wherein the common interface is a network-based interface, wherein the network-based interface is configured to present statuses of the computing resource and other computing resources and the status information about the plurality of computing devices in a hierarchical presentation.

17. The non-transitory computer-readable storage medium of claim 16, wherein the indication is presented on the network-based interface, and wherein the network-based interface is further configured to provide controls to interact with the plurality of computing devices at different hierarchical levels, and wherein the hierarchical levels comprise an individual computing device level and a group of computing device levels.

18. The non-transitory computer-readable storage medium of claim 14, wherein the common interface comprises a network-based interface, wherein the network-based interface is configured to facilitate a first option to query information about the computing device and a second option to request the operation on the computing device.

19. The non-transitory computer-readable storage medium of claim 18, wherein the instructions when executed on the computing node further configure the computing node to perform operations comprising:
   in response to a selection of the first option, querying a data store storing status information and a real time registry about the computing device to retrieve the information about the computing device;
   generating a status of the computing device based at least in part on the retrieved information; and
   presenting the status at the network-based interface.

20. The non-transitory computer-readable storage medium of claim 18, wherein the instructions when executed on the computing node further configure the computing node to perform operations comprising:
   in response to a selection of the second option, sending the request to perform the operation;
   receiving, from the agent, data indicative of the execution of the operation on the computing device; and
   formatting the data for presentation at the network-based interface.

* * * * *